United States Patent [19]
Torpie et al.

[11] 3,867,702
[45] Feb. 18, 1975

[54] DISTORTION MEASURING APPARATUS

[75] Inventors: John D. Torpie, Penfield; Allan J. Bell, Fairport; Michael L. Gorham, Rochester; Walter G. Keating, Baldwinsville, all of N.Y.

[73] Assignee: Xerox Corporation, Stamford, Conn.

[22] Filed: June 28, 1973

[21] Appl. No.: 374,703

Related U.S. Application Data

[62] Division of Ser. No. 214,146, Dec. 30, 1971, Pat. No. 3,798,576.

[52] U.S. Cl. ............... 328/163, 307/235 R, 328/26, 328/147, 328/151
[51] Int. Cl. ........................................ H04b 15/00
[58] Field of Search ........... 328/147, 149, 150, 151, 328/163-164, 26; 307/235 R

[56] References Cited
UNITED STATES PATENTS

| | | | |
|---|---|---|---|
| 3,434,053 | 3/1969 | McKee | 324/132 |
| 3,502,993 | 3/1970 | Schurzinger et al. | 328/163 X |
| 3,530,385 | 9/1970 | Smith et al. | 328/151 X |

Primary Examiner—John Zazworsky

[57] ABSTRACT

Apparatus for measuring the distortion introduced to a rectangular wave pulse by a transmission medium. Circuitry is provided for measuring the positive peak value, negative peak value and DC average value of the distorted pulse. The negative peak value and DC average value are subtracted from the positive peak value to give an indication of the delay distortion caused by the transmission medium.

6 Claims, 4 Drawing Figures 3,867,702

DISTORTION MEASURING APPARATUS

This is a division, of application Ser. No. 214,146, filed Dec. 30, 1971 now U.S. Pat. No. 3798576

BACKGROUND OF THE INVENTION

This invention, relates to apparatus for measuring delay and amplitude distortion experienced by a signal passed through a bandwidth limited transmission line.

Most transmission media tend to cause a degree of signal distortion normally in the form of frequency dependent phase delays and attenuation. As a general rule, such distortion is undersirable because it changes the amplitude and phase relationships of the spectral components of the signal thereby degrading the quality or fidelity of the received signal.

To compensate for this distortion, equalizers are utilized and bacause the distortion introduced depends on the individual transmission medium and may vary over extended periods of time, variable equalizers are generally preferred over fixed equalizers. In order to properly set the equalizer, it is necessary to measure the amount of distortion introduced by the transmission medium.

It is therefore an object of this invention to provide distortion measuring apparatus.

SUMMARY OF THE INVENTION

In accordance with principles illustrative of this invention, circuitry is provided for measuring the distortion introduced to a rectangular wave pulse by a transmission medium. The positive peak value, negative peak value and DC average value of the distorted pulse are measured. The negative peak value and the DC average value are subtracted from the positive peak value to give an indication of the delay distortion caused by the transmission medium.

BRIEF DESCRIPTION OF THE DRAWING

The foregoing will be readily apparent upon reading the following description in conjunction with the drawing in which.

DETAILED DESCRIPTION OF THE PREFERRED EMBODIMENT

Figure 1:
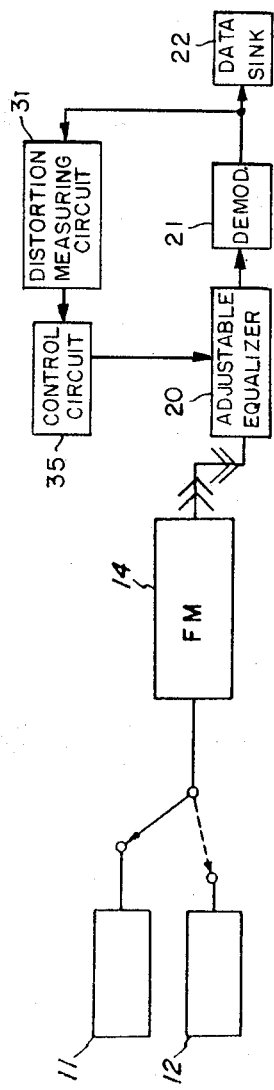
FIG. 1 depicts a block diagram of a system in which this invention finds utility.

Referring to FIG. 1 in general the apparatus of the present invention is comtemplated for use in a transmission system in which a train comprising a predetermined number of discrete test pulses is transmitted either from a separate pulse source 11, or from a data source 12 prior to the transmission of any data. The series train of pulses may be modulated by an FM modulator 14 and transmitted over a channel 15 having a limited bandwidth capability, such as an ordinary telephone line. The transmission channel introduces frequency dependent phase delay and amplitude attenuation to the test pulses before they are received by the receiver.

At the receiver, the incoming pulses are transmitted through an adjustable equalization network 20, demodulated to baseband by a suitable demodulator 21 and then applied to a data utilization means or data sink 22.

The apparatus also includes a distortion measuring circuit 31 for deriving signals representative of the phase and amplitude distortion suffered by the test pulses. The circuit 31 is coupled to the output of demodulator 21 so that the combined effects of the transmission line 15 and the adjustable equalizer 20 are taken into consideration. The output of distortion measuring circuit 31 is coupled to control circuit 35 which identifies the particular equalization network, which in combination with transmission line 15 results in the least amount of distortion. The latter operation and circuitry is fully disclosed in the aforementioned application, now U.S. Pat. No. 3,798,576, from which the present application has been divided.

Figure 4:
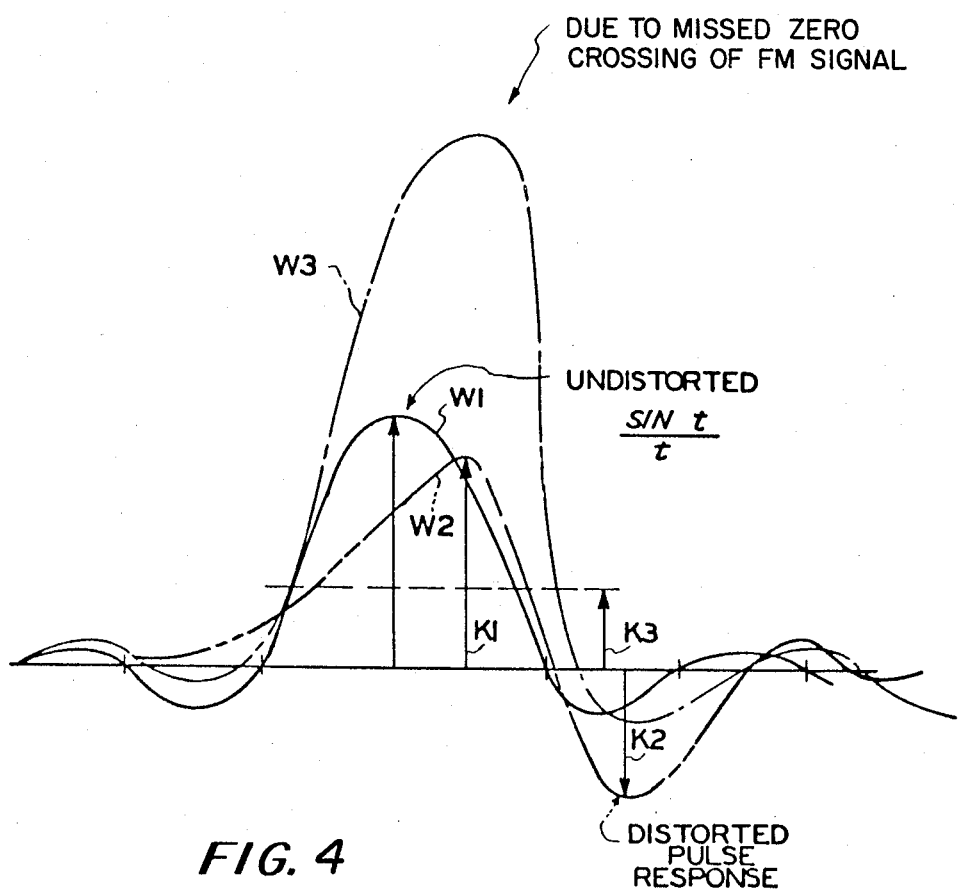
FIG. 4 illustrates the distorted and undistorted amplitude versus time characteristics of the signal received in response to the application of a pulse to a typical limited bandwidth transmission line.

Turning for a moment to FIG. 4, depicted therein are illustrative distorted and undistorted pulse shapes. Curve W1 is an undistorted pulse of the form sin $t/t$; curve W2 is a typical distorted pulse; and curve W3 is a distorted pulse due to demodulator 21 missing a zero crossing of the FM signal. It has been found that if the negative peak value (K2) and the DC average value (K3) are subtracted from the positive peak value (K1) of the received pulse, this difference, termed the peak-to-average difference (PAD), gives a good measure of the distortion. A higher PAD reading usually means less distortion. However, in the case of curve W3, a very high PAD reading is obtained, even through it is not an undistorted pulse.

Figure 2:
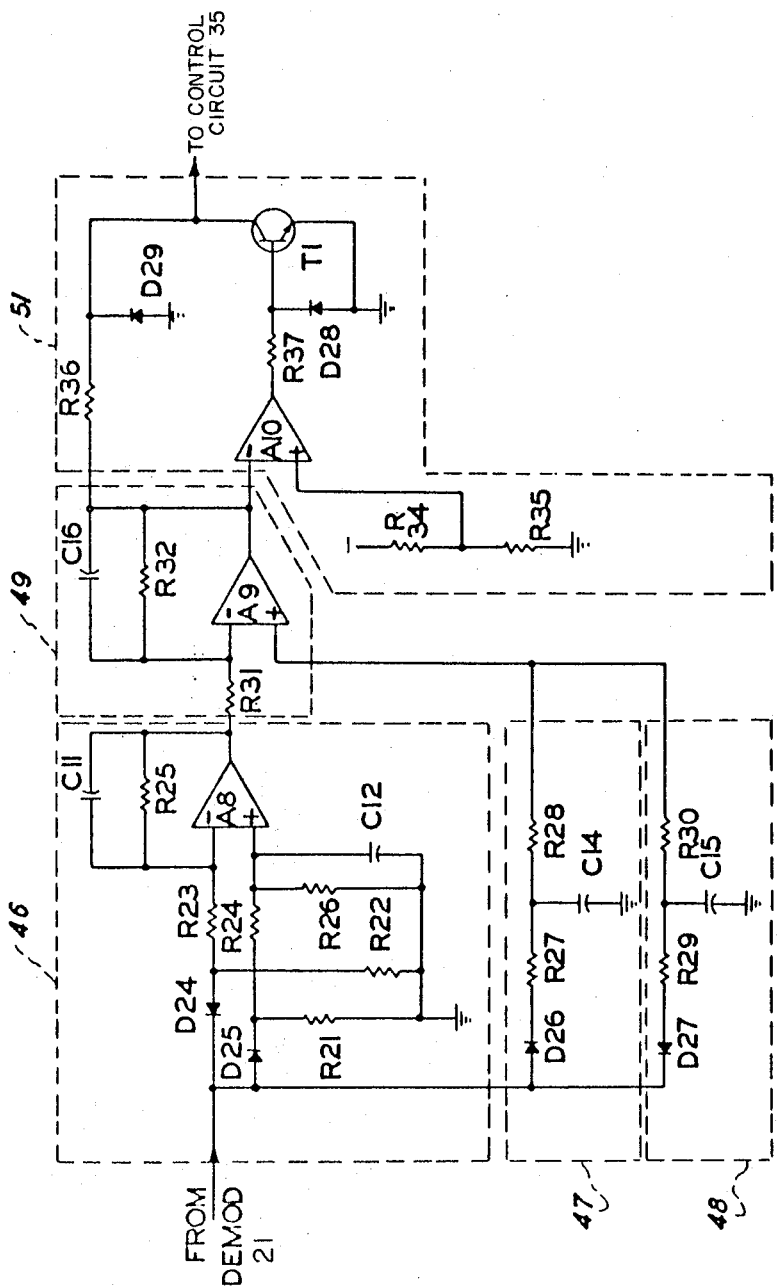
FIGS. 2 and 3 show two different embodiments of circuitry utilizing the principles of this invention.
Figure 3:
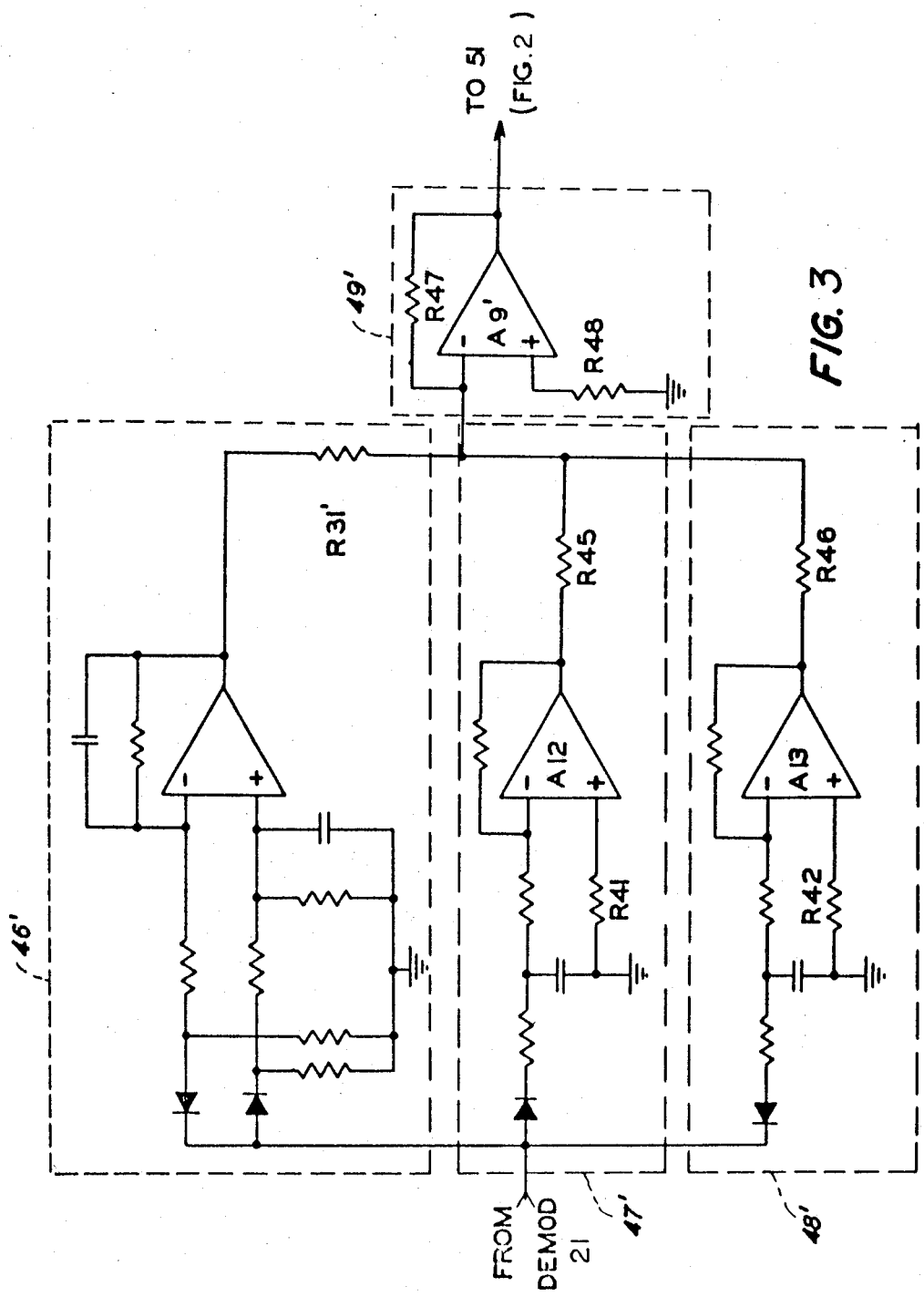

The distortion measuring circuit 31 supplies signals which are representative of the signal distortion existing at the output of equalizer 20. FIGS. 2 and 3 show two alternative embodiments for this circuit. As shown in FIG. 2 the distortion measuring circuitry includes a full wave rectifier 46 comprised of diodes D24 and D25, an operational amplifier A8 associated with resistive and capacitive elements R21 through R25 and C11 and C12 of suitable values operatively connected to the output of the demodulator 21. The distortion measuring circuitry also includes positive and negative peak detecting circuits 47 and 48, respectively connected to the output of the demodulator 21. The positive peak detector 47 includes a diode D26, a pair of resistors R27, R28, and a capacitor C14; and the negative peak detector 48 includes a diode D27, a pair of resistors R29, R30, and a capacitor C15. Additionally, the circuitry is provided with a summing stage 49 comprised of an operational amplifier A9, having its inverting input connected to the rectifier via a coupling resistor R31 and its non-inverting input 46 connected to the outputs of the positive and negative peak detectors 47 and 48.

Connected in parallel between the output and the inverting input of the amplifier A9 there are a resistor R32 and a capacitor C16. Thus, the amplitude of the signal appearing at the output of the amplifier A9 is the postive peak K1 and the negative peak K2 and the DC average K3 value of the equalized signal provided by the equalizer 20, e.g., the peak-to-average $= f(K1-K2-K3)$. As evident from the comparison of the two waves W1 and W2, the positive peak value K1 is larger for the least distorted of the equalized signals, i.e., the one most closely approaching an idealized sin $t/t$ impulse response characteristic of a bandwidth limited transmission line. Consequently the delay network or delay network/amplifier combination which passes the least distorted of the test pulses yields the highest amplitude PAD reading, thereby identifying the optimum equalizer adjustment for the particular transmission line.

It 21. When been found that when the delay distortion may occasionally be sufficiently severe to cause one or more zero crossings of the frequency modulated wave to be missed by the demodulator 21.When that occurs, the distortion measuring circuit 31 receives an extremely distorted distorted waveform W3, thereby causing an abnormally high PAD reading which in turn may lead to misidentification of the optimum equalizer adjustment for the particular transmission line. To prevent that there is a threshold detector 51 for grounding the output of the distortion measuring circuitry when the PAD reading exceeds a preestablished level.

As shown in FIG. 2, the threshold detector 51 comprises a resistor R36 for connecting the output of the amplifier A9 to the output of the distortion measuring circuit 31. The output of circuit 31 is returned to ground through a reversely poled diode D29 and the collector-emitter circuit of a normally non-conducting transistor T1 so that it usually follows the output of the amplifier A9 quite closely. There is, however, another operational amplifier A10 which has its inverting input coupled to the output of the operational amplifier A9, its non-inverting input connected to a junction between a pair of voltage dividing resistors R34 and R35, and its output coupled by a current limiting resistor R36 to the base of the transistor T1. Accordingly, if the output signal provided by the amplifier A9 exceeds the magnitude of the threshold voltage established by the voltage dividing ratio of the resistors R34 and R35, the transistor T1 is driven into conduction so that it then effectively grounds the output of circuit 31. To protect the transistor T1, there is preferably an oppositely poled diode D28 connected in parallel with its base-emitter junction.

FIG. 3 illustrates an alternative embodiment of circuit 31 which is essentially the same as the one shown in FIG. 2 except for the following minor modifications. First, the positive and negative peak detectors 47' and 48' include respective operational amplifier A12 and A13, with respective drift stabilizing resistors R41 and R42 for weighting the contributions of the positive and negative peak K1 and K2 to the overall peak-to-average difference signal. As shown in FIG. 3 the summing stage 49' is also arranged somewhat differently in that the outputs of the full wave rectifier 46' and of the postitive and the negative peak detectors 47' and 48' are all applied to the inverting input terminal of the operational amplifier A9' which, in turn, has its non-inverting input terminal returned to ground through a drift stabilizing resistor R48. The output of the summing stage 49' is then applied to the negative input terminal of the operational amplifier A10 shown in FIG. 2.

It is understood that the above-described arrangement is merely illustrative of the application of the principles of this invention. Numerous other arrangements may be devised by those skilled in the art without departing from the spirit and scope of this invention.

What is claimed is:

1. Apparatus for measuring the amount of distortion introduced to a rectangular wave pulse by a transmission medium and providing a signal at an output terminal thereof representative of said distortion, said apparatus comprising
    means for measuring the positive peak value of the distorted pulse;
    means for measuring the negative peak value of the distorted pulse;
    means for measuring the DC average valve of the distorted pulse, and
    means for summing the positive and the negative peak values and the DC average values to provide an output signal at said output terminal representing a measure of the delay distortion caused by the transmission medium.

2. The distortion measuring apparatus according to claim 1 wherein said summing means is adapted to provide said output signal representing the positive peak value minus the negative peak value minus the DC average value.

3. The distortion measuring apparatus according to claim 2, further including means responsive to said output signal exceeding a predetermined value for grounding said output terminal.

4. The apparatus according to claim 3 wherein said grounding means includes
    an operational amplifier having first and second input means and an output means,
    means for applying said output signal of said summing means to said first input means,
    DC biasing source applied to said second input means for establishing said predetermined value at said amplifier, and
    means operatively connected to said operational amplifier for applying said output signal of said summing means to said output terminal of said apparatus when said output signal is below said predetermined value and applying substantially zero potential to the apparatus output terminal when said output signal is above said predetermined value.

5. The apparatus according to claim 4, wherein said applying means includes a switching means for selectively shunting the output terminal to ground potential.

6. The apparatus according to claim 5 wherein said switching means includes a transistor connected in a common emitter configuration with its collector electrode connected to the output of said distortion measuring apparatus, means normally biasing said transistor into its non-conducting state when the output of said operational amplifier indicates said output signal is below said predetermined value and into its conductive state when the output of said operational amplifier indicates said output signal is above said predetermined value.

* * * * *

UNITED STATES PATENT OFFICE
CERTIFICATE OF CORRECTION

Patent No. 3,867,702  Dated February 18, 1975

Inventor(s) John D. Torpie, Allan J. Bell, Michael L. Gorham and Walter G. Keating It is certified that error appears in the above-identified patent and that said Letters Patent are hereby corrected as shown below:

Column 1, line 17, delete "bacause" and substitute therefor --because--.

Column 2, line 51, after "rectifier", insert --46--.

Column 2, line 57, before "the" (last occurrence), insert --a function of the difference between--.

Column 2, line 58, delete "postive" and substitute therefor --positive--.

Column 2, line 60, after "peak-to-average", insert --difference (PAD)--.

Column 3, line 5, delete "21. When" and substitute therefor --has--.

Column 3, line 46, after "peak" (first occurrence), insert --signals--.

Claim 1, line 13, delete "valve" and substitute therefor --value--.

Signed and Sealed this eighteenth Day of November 1975

[SEAL]

Attest:

RUTH C. MASON
Attesting Officer

C. MARSHALL DANN
Commissioner of Patents and Trademarks